United States Patent [19]

Cook et al.

[11] Patent Number: 5,113,641

[45] Date of Patent: May 19, 1992

[54] LAWN MOWER CONTROL APPARATUS

[76] Inventors: Lewis W. Cook, Rte. 66 Box 4-A; Warren K. Cregger, Box 247, both of Ghent, W. Va. 25843

[21] Appl. No.: 668,224

[22] Filed: Mar. 12, 1991

[51] Int. Cl.$^5$ .................. A01D 34/64; A01D 34/86
[52] U.S. Cl. .................. 56/10.5; 56/10.7; 56/11.2; 56/14.1; 56/15.1
[58] Field of Search .......... 56/10.7, 15.1, 15.3, 56/15.4, 15.5, 13.5, 14.7, 16.7, DIG. 2, DIG. 7, DIG. 10, 228, 7, 14.1, 11.2

[56] References Cited

U.S. PATENT DOCUMENTS 2,483,762  10/1949  Ebenhoe .................................. 56/7
3,651,623   3/1972  Harley ............................. 56/15.4 X

*Primary Examiner*—Stephen J. Novosad
*Attorney, Agent, or Firm*—Leon Gilden

[57] ABSTRACT

An apparatus wherein a self-propelled tractor mounts a support plate, a spool, and a reversing motor mounted to the spool to effectively extend and retract a cable wound about the spool. The cable is directed forwardly to a mounting plate positioned rearwardly and coextensively of a rear edge of an associated lawn mower housing to permit extension and retraction of a lawn mower about an incline of an associated slope in use of the lawn mower. A modification of the invention includes a plurality of spools, each including a reversible motor mounted in association with each respective spool to permit steering of each spool by selective relative rotation of each spool.

7 Claims, 5 Drawing Sheets

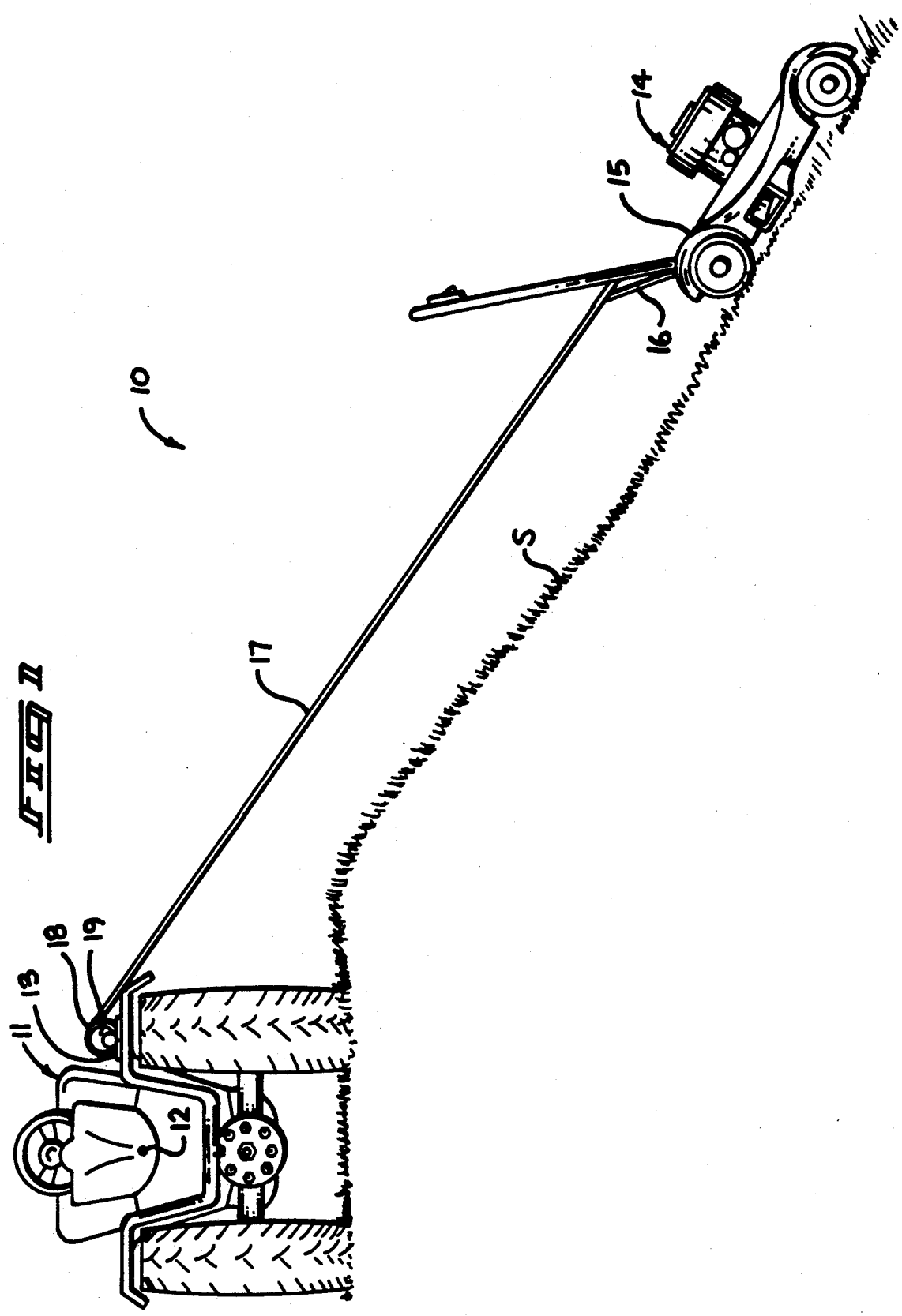

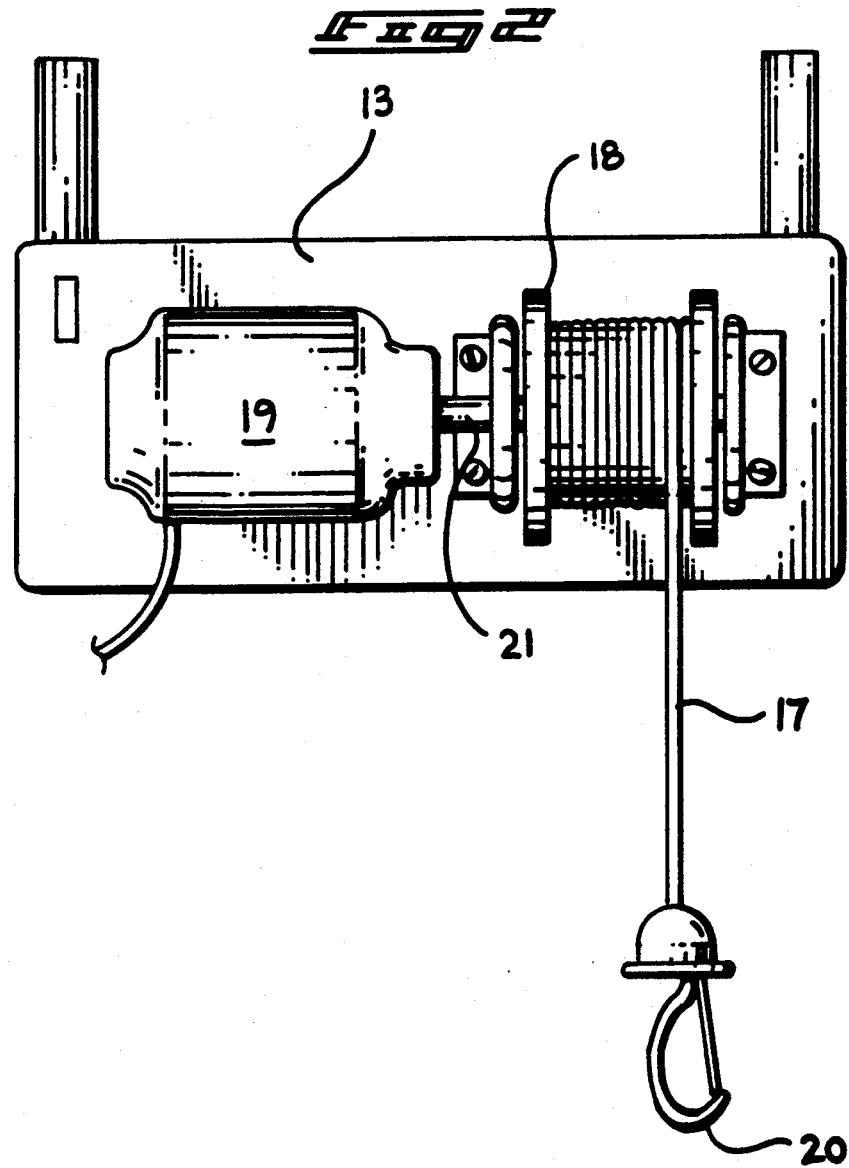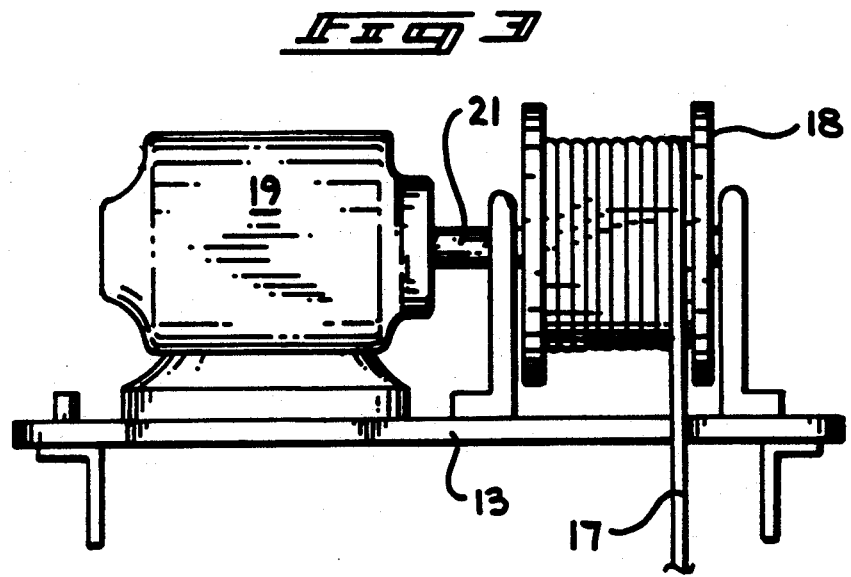

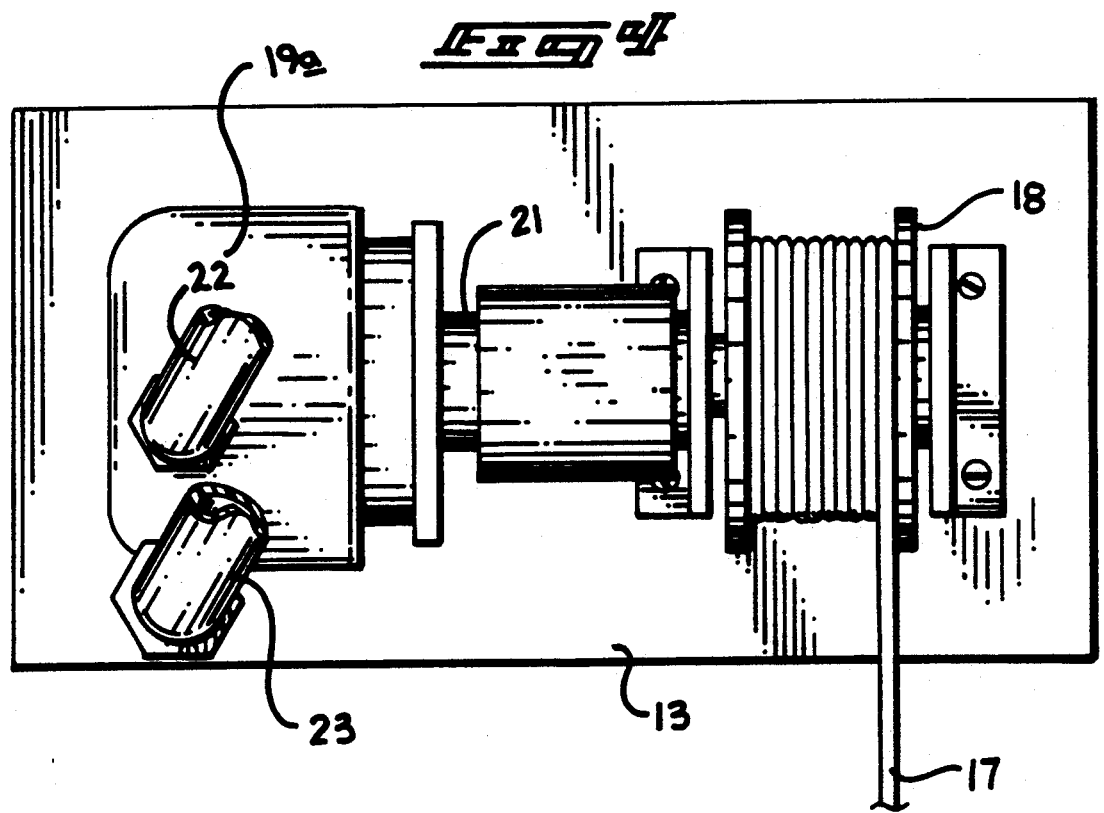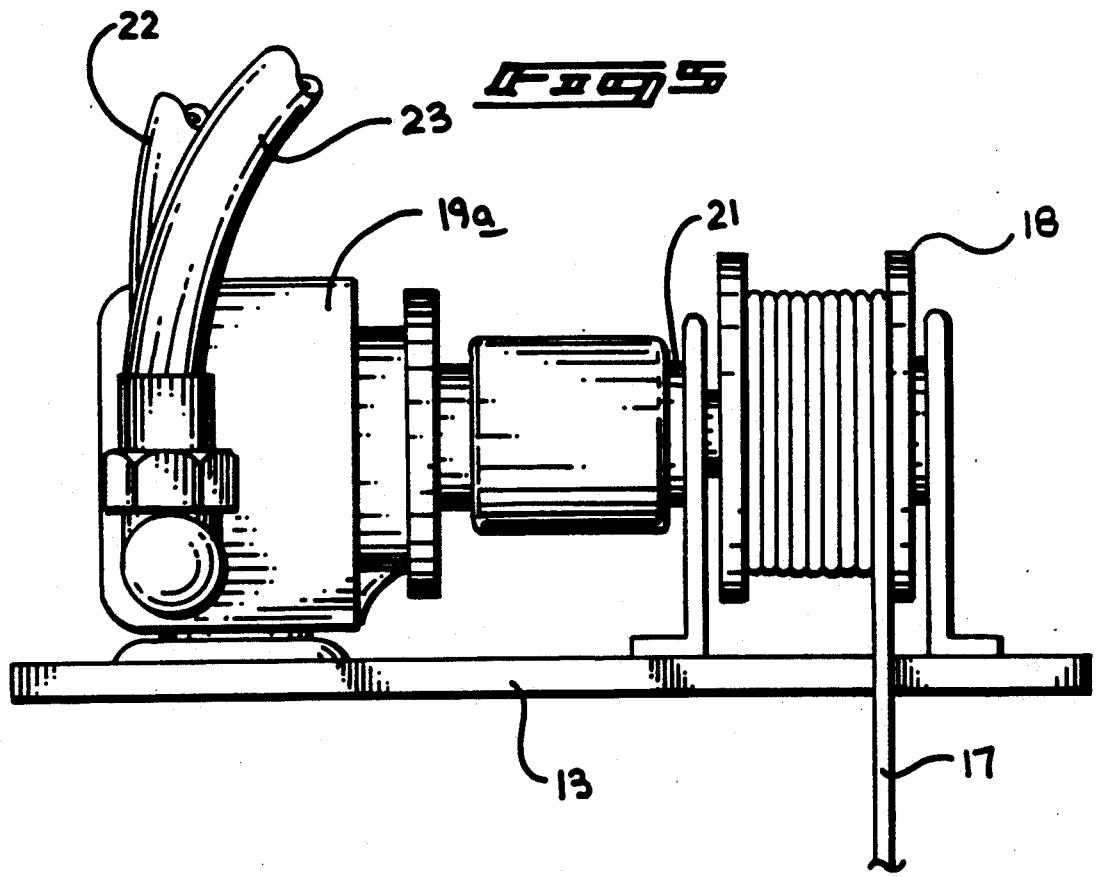

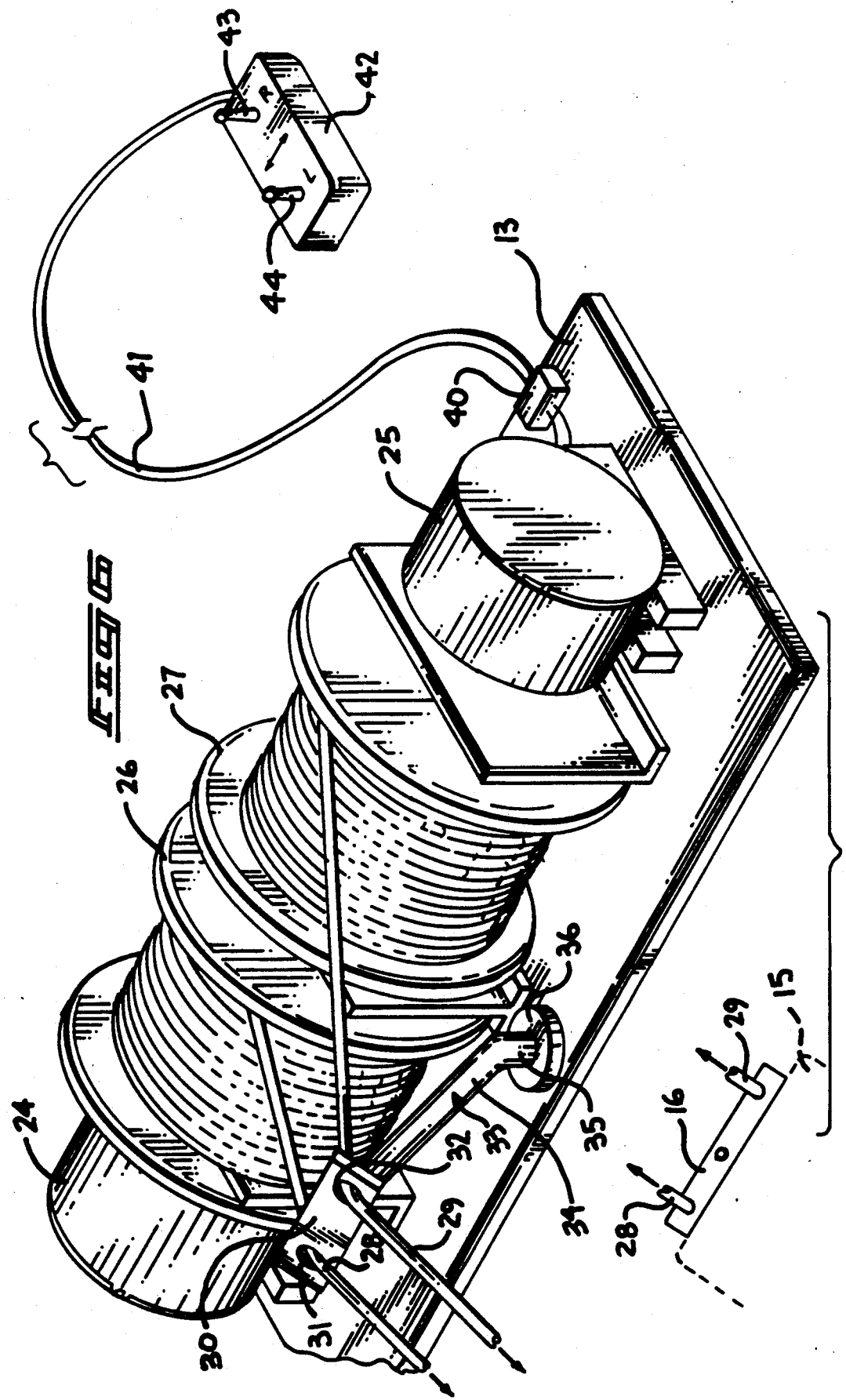

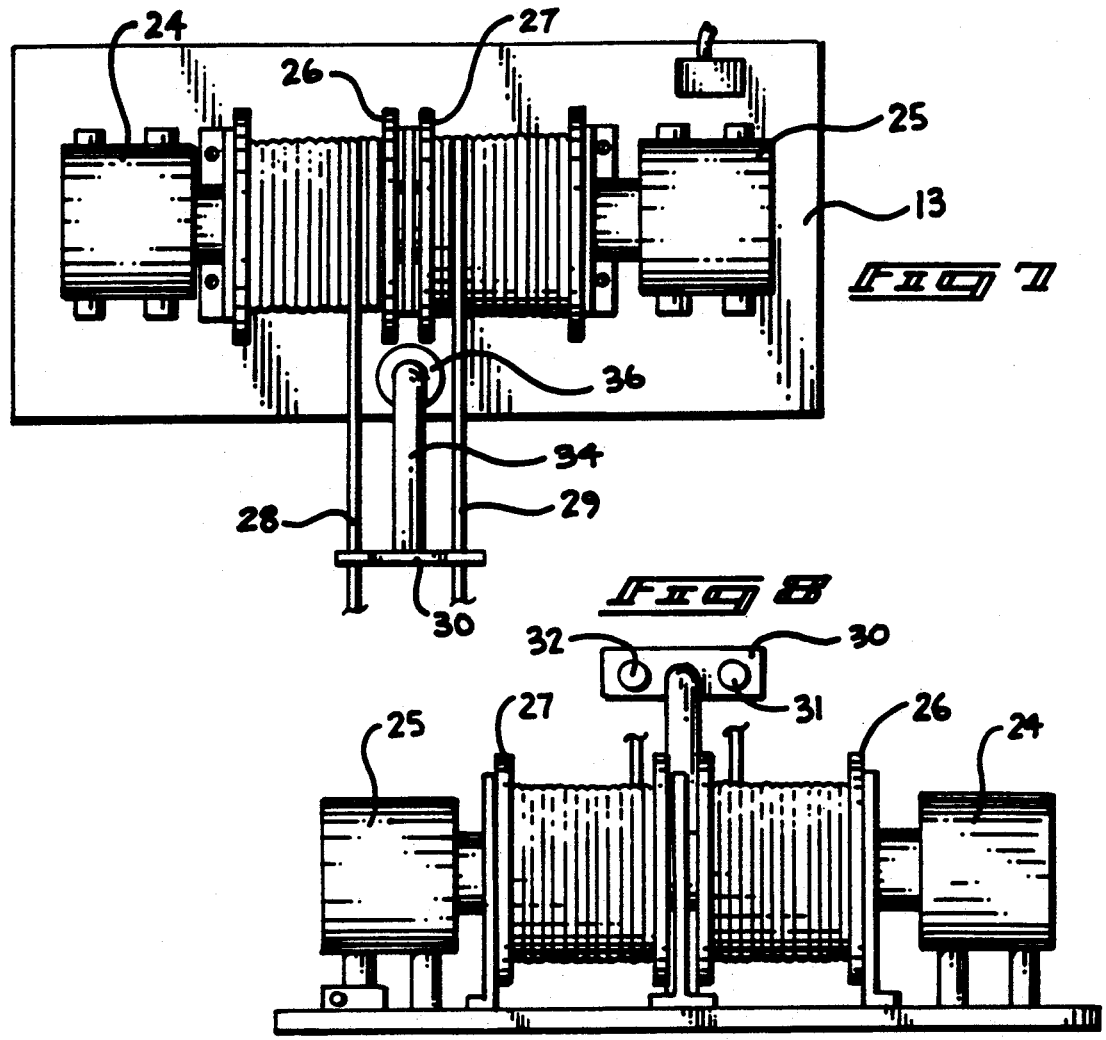
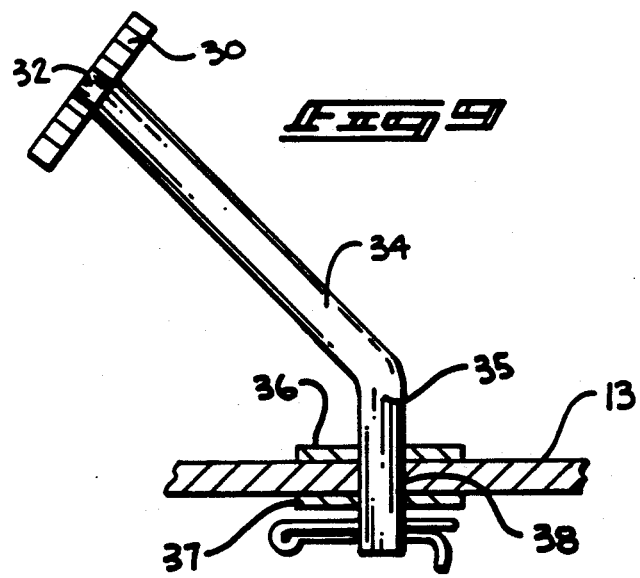

LAWN MOWER CONTROL APPARATUS

BACKGROUND OF THE INVENTION

1. Field of the Invention

The field of invention relates to lawn mower apparatus, and more particularly pertains to a new and improved lawn mower control apparatus wherein the same in associated with a self-propelled vehicle permits mowing of inclined surfaces of a lawn area.

2. Description of the Prior Art

Various mowing apparatus has been set forth in the prior art for the use of mowing various lawn areas. Particularly in mowing procedures, mowing of inclined surfaces may present a hazardous and unduly dangerous situation when using portable lawn mowers, such as relative slippage of an individual operator relative to the lawn mower endangers that operator should that operator come in contact with an associated lawn mower blade mounted to the lawn mower. The instant invention attempts to overcome deficiencies of the prior art by utilizing a self-propelled lawn mower vehicle movably about an upper edge of a sloped lawn surface to permit relative reciprocation of an associated lawn mower about the surface for its cutting. Examples of prior art structure include U.S. Pat. No. 4,896,493 to Neuerburg wherein a lawn mower includes a framework for mounting to an associated tractor in mowing of lawn areas.

U.S. Pat. No. 4,306,406 to Fulkerson, et al. sets forth a lawn trimming apparatus utilizing a housing for mounting to an associated tractor in adjacency to the tractor for trimming about various edge portions of structures.

U.S. Pat. No. 4,216,643 to Malone provides a guard apparatus for a rotary powered motor to stop an inadvertent positioning of an individual's foot under the associated housing of the lawn mower apparatus.

U.S. Pat. No. 4,090,346 to Dol sets forth a lawn mower organization utilizing a plurality of cutters and counter-rotating cutters supported on a rotatable supporter member or blade within the organization.

As such, it may be appreciated that there continues to be a need for a new and improved lawn mower control apparatus as set forth by the instant invention which addresses both the problems of ease of use as well as effectiveness in arranging operative and effective cutting of sloped surfaces of a lawn and in this respect, the present invention substantially fulfills this need.

SUMMARY OF THE INVENTION

In view of the foregoing disadvantages inherent in the known types of lawn mower apparatus now present in the prior art, the present invention provides a lawn mower control apparatus wherein the same utilizes cable control means in operative association with a self-propelled tractor and a lawn mower to control the lawn mower in cutting of sloped surfaces relative to the tractor. As such, the general purpose of the present invention, which will be described subsequently in greater detail, is to provide a new and improved lawn mower control apparatus which has all the advantages of the prior art lawn mower apparatus and none of the disadvantages.

To attain this, the present invention provides an apparatus wherein a self-propelled tractor mounts a support plate, a spool, and a reversing motor mounted to the spool to effectively extend and retract a cable wound about the spool. The cable is directed forwardly to a mounting plate positioned rearwardly and coextensively of a rear edge of an associated lawn mower housing to permit extension and retraction of a lawn mower about an incline of an associated slope in use of the lawn mower. A modification of the invention includes a plurality of spools, each including a reversible motor mounted in association with each repective spool to premit steering of each spool by selective relative rotation of each spool.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and imporved lawn mower control apparatus which has all the advantages of the prior art lawn mower apparatus and none of the disadvantages.

It is another object of the present invention to provide a new and improved lawn mover control apparatus which may be easily and efficiently manufactured and marketed.

It is a further object of the present invention to provide a new and improved lawn mower control apparatus which is of a durable and reliable construction.

An even further object of the present invention is to provide a new and improved lawn mower control apparatus which is susceptible of a low cost of manufacture with regard to both materials and labor, which accordingly is then susceptible of low prices of sale to the consuming public, thereby making such lawn mower control apparatus economically available to the buying public.

Still yet another object of the present invention is to provide a new and improved lawn mower control apparatus which provides in the apparatuses and methods of the prior art some of the advantages thereof, while simultaneously overcoming some of the disadvantages normally associated therewith.

Still another object of the present invention is to provide a new and improved lawn mover control apparatus wherein the same utilizes cable control to reciprocate a lawn mower relative to an associated tractor for effective cutting of sloped surfaces relative to the self-propelled tractor apparatus.

These together with other objects of the invention, along with the various features of novelty which characterize the invention, are pointed out with particularity in the claims annexed to and forming a part of this disclosure. For a better understanding of the invention, its operating advantages and the specific object attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an orthographic rear view, taken in elevation, of the instant invention.

FIG. 2 is a top orthographic view of the cable structure utilized by the instant invention.

FIG. 3 is an orthographic front veiw of the cable structure utilized by the instant invention. FIG. 4 is an orthographic top view of a modified control motor utilized by the instant invention.

FIG. 5 is an orthographic side view of the modified control motor as illustrated in FIG. 4.

FIG. 6 is an isometric illustration of a modified cable control structure utilized by the instant invention.

FIG. 7 is an orthographic top view of the cable control structure as set forth in FIG. 6.

FIG. 8 is an orthographic rear view of the cable control structure as set forth in FIG. 6.

FIG. 9 is an orthographic side view of the guide rod and guide plate structure utilized by the instant invention.

DESCRIPTION OF THE PREFERRED EMBODIMENT

With reference now to the drawings, and in particular to FIGS. 1 to 9 thereof, a new and improved lawn mower control apparatus embodying the principles and concepts of the present invention and generally designated by the reference numeral 10 will be described.

More specifically, the lawn mower control apparatus 10 of the instant invention essentially comprises a self-propelled tractor vehicle 11 defined about a vehicle longitudinal axis 12. A support plate 13 is mounted to the tractor vehicle essentially parallel to the longitudinal axis. The support plate 13 is positioned laterally offset relative to the axis 12 to a side of the vehicle, as illustrated in FIG. 1 For example. A lawn mover 14 that is mowing an inclined slope "S" is of a type utilizing a rotary blade rotatably mounted within a lawn mower housing 15. The lawn mower housing 15 includes a lawn mower mounting plate 16 fixedly mounted to a rear edge of the housing 15. A support cable 17 mounted medially of the mounting plate 16 at a forward end of the cable is wound about a spool 18 that is mounted on the mounting plate 16. The spool 18 is cooperative with a reversing motor 19 to permit selective descent and assent of the lawn mower 14 along the slope "S" during winding and unwinding of the cable 17 relative to the spool. Further, a cable hook 20 mounted to the forward terminal end of the spool 17 permits ease of securement of the cable to the support plate 13. A motor drive shaft 21 coaxially directed through the motor 19 is coaxially directed through the spool 18 and fixedly mounted thereto to permit selectively winding and reeling of the spool as desired. Alternatively, a reversing hydraulic motor 19a may be utilized, with a first and second respective hydraulic conduit 22 and 23 that may be directed into the hydraulic circuitry of the associated tractor 11 to effect selective winding and reeling of the spool 18, such as exemplified in FIGS. 4 and 5.

Alternatively (see FIGS. 6-9), a modified apparatus includes a plurality of reversible spools to permit steerage of the lawn mower 14. Specifically, a first reversing motor 24 and a second reversing motor 25, each fixedly mounted to a top surface of the support plate 13 and coaxially aligned relative to one another, are each coaxially and fixedly mounted to a respective first and second spool 26 and 27 to effect selective rotation of the respective first and second spools to permit selective unwinding, or alternatively winding, of the spools. Each of the respective spools 26 and 27 includes a respective first and second cable 28 and 29 wound therabout. Each respective first and second cable is directed through a guide plate 30. The guide plate 30 includes a respective first and second opening 31 and 32 positioned laterally of a guide rod 33, wherein the guide rod 33 is positioned rotatably through the mounting plate 13 and medially of the first and second spools 26 and 27 forwardly thereof adjacent a forward edge of the support plate. The guide rod 33 includes a first guide rod 34 whose upper terminal end is fixedly mounted to the guide plate 30 and whose lower terminal end is fixedly mounted to a second guide leg 35, wherein the second guide leg 35 is formed at an oblique angle to the first guide leg 34. A top spacer plate 36 is fixedly and orthogonally mounted about the second guide leg spaced from and parallel to a bottom spacer plate 37. The top and bottom spacer plates are spaced apart a predetermined spacing substantially equal to a predetermined thickness defined by the support plate 13. The second guide leg 35 is accordingly rotatably mounted within a cylindrical bushing 38 directed through the support plate 13, as illustrated in FIG. 9. A lock pin 39 directed through a lower terminal end of the second guide leg 35 is positioned underlying the bottom spacer plate 37 underlying the support plate 13. A control housing 40 is cooperative through a remote control cable 41 that is in turn mounted to a switch housing 42, wherein the switch housing 42 includes a respective first and second switch member 43 and 44 to selectively actuate the respective first and second reversing motors 24 and 25 to permit selective winding and unwinding of the spools. It should be understood that simultaneous winding or unwinding of the spools permits respective assent or descent of the associated lawn mower 14 along the slope "S". Upon the winding or unwinding of one of the spools relative to the other spool, the lawn mower 14 will in turn be angulated for steerage of the lawn mower by tensioning a lateral side of the mounting plate 16 as the forward terminal ends of the first and second cables 28 and 29 (see FIG. 6) are mounted adjacent opposed side edges of the mounting plate 16 optionally by use of the cable hook structure 20, as exemplified in FIG. 2.

Further, it should be noted that for optimum use in aligning the spool 18 relative to the associated slope, the alignment or further longitudinal axis defined by the reversing motor or motors and associated spool or spools is parallel relative to the longitudinal axis 12 of the tractor vehicle 11.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, a all suitable modifications and equivalents may be resorted to, falling within the scope of the invention.

What is claimed as being new and desired to be protected by Letters Patent of the United States is as follows:

1. A lawn mower control apparatus comprising, in combination,
    a self-propelled tractor vehicle, the tractor vehicle defined by a longitudinal axis, and
    a support member mounted on the tractor vehicle, and
    at least a first reversing motor mounted on a top surface of the support member, and
    a first spool mounted on the support member, with the first reversing motor coaxially aligned with the first spool defining a further longitudinal axis, and
    a first cable wound about the first spool, and
    a lawn mower member, the lawm mower member including a housing, and the housing including a rear terminal edge, and
    a mounting plate fixedly mounted to the housing contiguously with the mounting plate, and
    a first forward end of the first cable mounted to the mounting plate, and
    a second reversing motor and a second spool mounted to the second reversing motor, the second spool coaxially aligned with the second reversing motor, and the first reversing motor, the second reversing motor, the first spool, and the second spool coaxially aligned about the further longitudinal axis, and the further longitudinal axis oriented parallel to the longitudinal axis of the tractor vehicle.

2. An apparatus as set forth in claim 1 wherein the second spool includes a second cable wound thereabout, wherein the second cable includes a second cable forward end, and the mounting plate including a first side edge and a second side edge, with the forward end of the first cable mounted adjacent a first side edge and the forward end of the second cable mounted adjacent a second side edge.

3. An apparatus as set forth in claim 2 wherein the support member is defined as a support plate, with the support plate rigidly mounted to the tractor vehicle, wherein the forward end of the first cable and second cable each include a respective hook member mounted thereon to permit relative pivotment of each cable relative to the mounting plate.

4. An apparatus as set forth in claim 3 including a guide plate, the guide plate including a first opening and a second opening, the first cable directed through the first opening and the second cable directed through the second opening, and the guide plate including a guide rod fixedly mounted to the guide plate, the guide rod including a first guide leg, wherein the first guide leg is fixedly mounted to the guide plate at an upper end of the first guide leg, and a lower end of the first guide leg mounted to a second guide leg, with the first guide leg and the second guide leg defining an oblique angle therebetween, and the second guide leg pivotally and orthogonally directed through the support plate.

5. An apparatus as set forth in claim 4 wherein the second guide leg includes a top spacer plate fixedly and orthogonally mounted to the second guide leg, and the second guide leg including a bottom spacer plate fixedly and orthogonally mounted to the second guide leg spaced from the top spacer plate a predetermined width, and the support plate defined by a predetermined thickness substantially equal to the predetermined width.

6. An apparatus as set forth in claim 5 wherein the guide rod is mounted medially between the first spool and the second spool and positioned adjacent a forward edge of the support plate.

7. An apparatus as set forth in claim 6 including a control housing, and the control housing including a remote control cable and a switch housing mounted to the remote control cable remote from the control housing, and the switch housing including a first switch member to selectively actuate the first reversing motor, and the second switch member mounted within the switch housing to selectively actuate the second reversing motor.

* * * * *